United States Patent [19]

Nyfeler et al.

[11] Patent Number: 5,109,767

[45] Date of Patent: May 5, 1992

[54] DEVICE FOR THE EMBOSSING OF FINE STRUCTURES

[75] Inventors: Alex Nyfeler, Baar; Gregor Antes, Hirzel; Hansjörg Schmidlin, Luzern, all of Switzerland

[73] Assignee: Landis & Gyr Betriebs AG, Zug, Switzerland

[21] Appl. No.: 576,269

[22] Filed: Aug. 31, 1990

[30] Foreign Application Priority Data

Sep. 29, 1989 [CH] Switzerland ............... 535/89

[51] Int. Cl.$^5$ ............................. B41F 17/00
[52] U.S. Cl. ........................ 101/23; 101/228
[58] Field of Search ............. 101/232, 24, 32, 395, 101/228, 415.1

[56] References Cited

U.S. PATENT DOCUMENTS

| 1,978,715 | 10/1934 | Meisel | 101/228 |
|---|---|---|---|
| 3,603,256 | 9/1971 | Moos et al. | 101/415.1 X |
| 4,038,917 | 8/1977 | De Ligt | 101/23 |
| 4,129,238 | 12/1978 | Herd | 101/228 |
| 4,416,200 | 11/1983 | Yon | 101/228 |
| 4,417,516 | 11/1983 | Fischer | 101/228 X |
| 4,747,347 | 5/1988 | McAnelly | 101/228 X |
| 4,773,718 | 9/1988 | Weitzen et al. | 350/3.61 |
| 4,896,605 | 1/1990 | Schroder | 101/228 X |
| 4,966,075 | 10/1990 | Brian | 101/228 X |

FOREIGN PATENT DOCUMENTS

| 0159225 | 10/1985 | European Pat. Off. |
| 0244348 | 4/1987 | European Pat. Off. |
| 238263 | 9/1911 | Fed. Rep. of Germany |
| 403649 | 10/1924 | Fed. Rep. of Germany |
| 2523639 | 12/1976 | Fed. Rep. of Germany |
| 3445012 | 6/1985 | Fed. Rep. of Germany |
| 530018 | 12/1972 | Switzerland |
| 2138360 | 10/1984 | United Kingdom |
| 2151188 | 7/1985 | United Kingdom |

OTHER PUBLICATIONS

Polyester Embossing Machine by Global Images Inc. Research Disclosure 290, 122, Jun. 1988.

Primary Examiner—Edgar S. Burr
Assistant Examiner—Moshe I. Cohen
Attorney, Agent, or Firm—Marmorek, Guttman & Rubenstein

[57] ABSTRACT

A device for embossing a set of motifs having a predetermined motif interval onto a length of film utilizes a rotating embossing cylinder which is provided with a recess for the attachment of an embossing matrix. The embossing matrix has a usable length which is less than the entire circumference of the embossing cylinder but more than 50% of the circumference of the embossing cylinder. A rotating counterpressure cylinder is positioned adjacent the embossing cylinder, such that the film advances between the counterpressure cylinder and the embossing cylinder for embossing said motifs from said embossing matrix onto the film and for defining a free phase during each rotation of the embossing cylinder when the recess is positioned adjacent the film. The device also comprises movement means for providing an additional relative movement between the length of film and the embossing matrix during each free phase of the embossing cylinder. A control mechanism determines the amplitude of the additional relative movement in accordance with the motif interval. It is a significant advantage of the present invention that the embossing cylinder circumference is independent of the motif interval thus allowing for easy change of the embossing matrix.

8 Claims, 4 Drawing Sheets

DEVICE FOR THE EMBOSSING OF FINE STRUCTURES

FIELD OF THE INVENTION

The present invention relates to a device and to a process for the embossing of fine structures.

BACKGROUND OF THE INVENTION

Such devices and processes for the embossing of fine structures can be used for example to produce lengths of film with optical diffraction structures such as holograms, diffraction gratings, etc. at low cost.

Processes according to CH-PS (Swiss Patent) 530 018 are known to emboss the optical diffraction structures into the lengths of film by means of a heated, endless, band-shaped embossing matrix.

An embossing device known from U.S. Pat. No. 4,773,718 is equipped with a rotating embossing cylinder which bears an embossing matrix on its circumference and with a counter-pressure cylinder rolling against the embossing cylinder. The length of film is guided between the two cylinders and is pressed against an embossing matrix by means of the smooth counterpressure cylinder. With each rotation of the embossing cylinder, the raised structures of the embossing matrix are embossed into the length of film whereby the advancing speed of the length of film is equal to the peripheral velocity of the embossing matrix. Motifs follow each other on the embossing matrix at a predetermined motif interval which is an integral divisor of the circumference of the embossing cylinder. For a different motif interval an embossing cylinder with the corresponding circumference is required.

A "POLYESTER EMBOSSING MACHINE" is known from a printed document of Global Images Inc., 509 Madison Avenue, New York, NY 10022, USA under reference number DP 506 and is equipped with an embossing cylinder between two counterpressure cylinders, whereby the length of film is guided twice to the embossing cylinder via a loop in the film to be embossed. The length of the loop is determined by the circumference of the embossing cylinder. The embossed length of film has segments following each other which were embossed alternately under one of the two counterpressure cylinders. The peripheral surface of one-half of the embossing cylinder serves as a support of the embossing matrix. The other half of the embossing cylinder surface is made in form of a recess in which a mechanical mechanism is installed to clamp the embossing matrix. This arrangement makes it possible to replace the embossing matrix rapidly, but this is at the expense of a poor utilization of the embossing cylinder.

A stamping device with a compensating system serving to catch the continuously fed and removed length of film and which periodically enables the length of film to stop briefly under the stamp is known from EP 244 348.

DE-OS 34 45 012 describes a multi-color printing machine. The machine has a pressure cylinder with one or two printing plates for each color which produces motifs at any desired motif interval on a length of paper. The length of each printing plate is an integral multiple of the motif interval. The printing cylinder is provided with two locations offset by precisely 180° to load the identical rigid printing plates. The circumference of the printing cylinder is considerably greater than twice the length of a printing plate. The length of paper is guided twice over a preset loop to the same printing cylinder to be imprinted by means of two counterpressure cylinders offset by 180°. Between the end of one printing plate and the beginning of the other, the contact between the two printing plates and the length of paper moving at constant speed is briefly interrupted. During that interruption a preset advance of the paper length is achieved through the lowering of the angular velocity of the printing cylinder, whereby an aligning of the printing plate under the second counterpressure cylinder with the as yet unprinted interval between the motifs already printed on the paper length under the first counterpressure cylinder takes place.

It is an object of the instant invention to provide a device and process for economical embossing of fine structures into a length of film, whereby said device utilizes the circumference of an embossing cylinder more efficiently and whereby a preset motif interval between embossed motifs is independent of the circumference of the embossing cylinder.

SUMMARY OF THE INVENTION

The present invention is directed to a device and process for embossing a set of motifs having a predetermined motif interval onto a length of film. The inventive device and process utilizes a rotating embossing cylinder which is provided with a recess for the attachment of an embossing matrix. The embossing matrix has a usable length which is less than the entire circumference of the embossing cylinder but more than 50% of the circumference of the embossing cylinder. A rotating counterpressure cylinder is positioned adjacent the embossing cylinder, such that the film advances between the counterpressure cylinder and the embossing cylinder for embossing the motifs from the embossing matrix onto the film and for defining a free phase during each rotation of the embossing cylinder when the recess is positioned adjacent the film. The device also comprises movement means for providing an additional relative movement between the length of film and the embossing matrix during each free phase of the embossing cylinder. A control mechanism determines the amplitude of the additional relative movement in accordance with the motif interval.

It is a significant advantage of the present invention that the embossing cylinder circumference is independent of the motif interval thus allowing for easy change of the embossing matrix.

DETAILED DESCRIPTION OF THE INVENTION

Figure 1:
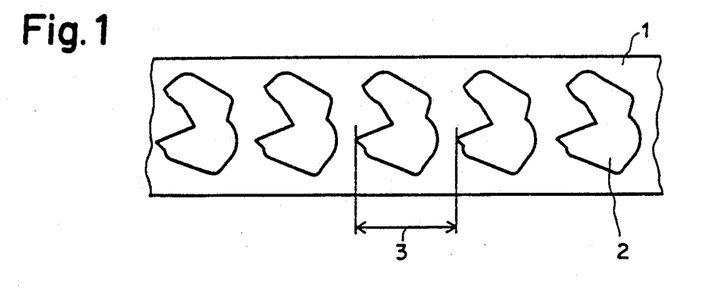
FIG. 1 shows an imprinted length of film with motifs imprinted at a preset motif interval.

In FIG. 1, the reference 1 designates a length of film which has been embossed with fine, relief-like structures. The structures form motifs 2 which follow each other at a preset motif distance or interval 3 on the length of film 1. The material of the length of film 1 is preferably a thermoplastic material such as polyvinyl chloride or polyester, or a layered or fiber lamination covered with a thermoplastic. Thin metal films as mentioned in U.S. Pat. No. 4,773,718 can also be used. The structures constitute advantageously elements which are effective optical diffractors, e.g. diffraction gratings or holograms.

Figure 2:
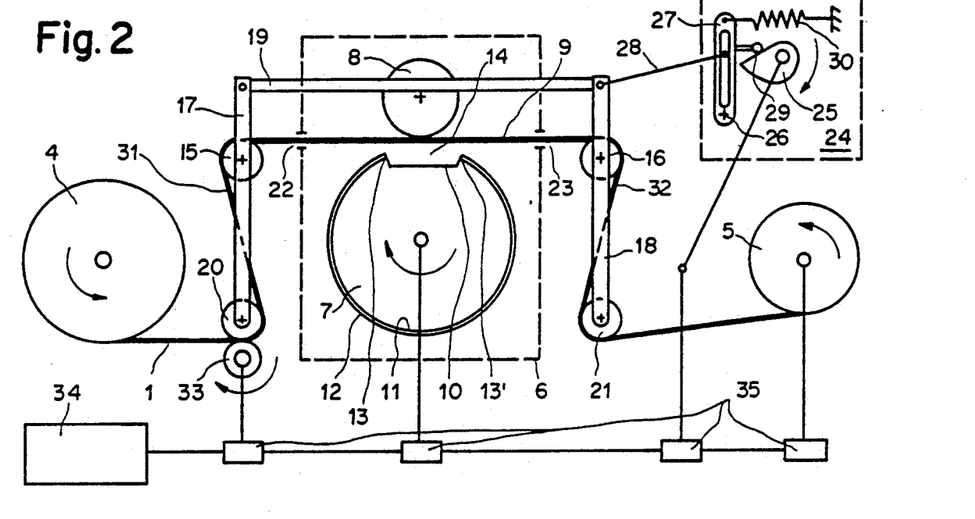
FIG. 2 shows an embossing device with compensating rollers swinging periodically to and fro.

FIG. 2 shows the elements of an embossing device. The non-embossed length of film 1 is rolled on a supply roll 4. A wind-up roll 5 receives the embossed length of film 1. An embossing station 6 is located between the two rolls 4 and 5. The embossing station 6 comprises at least one embossing cylinder 7 and at least one counter-pressure cylinder 8 rolling off against the embossing cylinder 7. The axes of the two cylinders 7 and 8 are capable of being displaced radially with respect to each other and can be adjusted precisely at a predetermined distance, whereby the length of film 1 is subjected to a predetermined embossing pressure between the two cylinders 7 and 8. The feeding and removal of the length of film 1 takes place in a tangential plane common to the embossing cylinder 7 and to the counter-pressure cylinder 8, in an embossing plane 9. For example, the embossing cylinder 7 can be placed below, and the counter-pressure cylinder 8 above the length of film 1 in the embossing station 6.

At the circumference of the embossing cylinder 7, a recess 10 is formed. The recess 10 has lateral walls oriented radially, for example. A remaining, smoothly polished cylindrical surface portion of the embossing cylinder 7, i.e. a circumferential section 11, serves as support for an embossing matrix 12. The embossing cylinder 7 and the embossing matrix 12 are preferably warmed during embossing to a predetermined temperature dependent on the material of the length of film 1.

The matrix 12 is provided with a negative of the fine relief-like structures on its surface towards the counter-pressure cylinder 8, and these are embossed into the length of film 1 and constitute the motifs 2 (FIG. 1). The usable length of the embossing matrix 12 is predetermined by the circumferential section 11 and comes to more than 50% of the circumference of the embossing cylinder 7.

The recess 10 makes it possible to attach the embossing matrix 12 rapidly. The two ends of the embossing matrix 12 are clamped in place radially inward around a starting edge 13 or around an end edge 13' on a sidewall of the recess 10 (see FIG. 3). The direction of rotation of the embossing cylinder 7 determines the designation starting edge 13 or end edge 13'.

The embossing matrix 12 is preferably made in form of a thin flexible sheet of metal, e.g. made of nickel with a thickness of 0.1 mm for this type of attachment. It extends over the entire polished surface of the circumferential section 11, lies smoothly against the circumferential section 11 and is stretched taut. The usable width of the length of film 1 and of the embossing matrix 12 can be 36 cm for each, for example, so that ten motifs of 3 cm diameter each which are embossed simultaneously into the length of film 1 can fit next to each other on the embossing matrix.

So long as the circumferential section 11 together with the embossing matrix 12 roll under the counter-pressure cylinder 8 during rotation of the embossing cylinder 7, the length of film 1 is clamped in between the embossing matrix 12 and the counter-pressure cylinder 8 and is subjected to the embossing pressure, whereby the fine structures are transferred from the embossing matrix 12 to the length of film 1. With each revolution of the embossing cylinder 7, an opening 14 is produced between the two cylinders 7 and 8 when the area of the recess 10 is facing the counter-pressure cylinder 8. The embossing pressure disappears and the length of film 1 can be shifted freely. Each revolution of the embossing cylinder 7 therefore comprises one embossing phase and one free phase.

It is advantageous to provide a first compensating roll 15 before the embossing station 6 and one compensating roll 16 after the embossing station 6. The two compensating rolls 15 and 16, a so-called compensating system, hold the length of film 1 in the embossing plane 9. The axes of the compensating rolls 15 and 16 are advantageously mounted on a parallelogram rod system and are capable of being shifted together parallel to the embossing cylinder 7, so that the advancing speed of the length of film 1 in the embossing station 6 can be changed briefly.

The parallelogram rod system comprises preferably two pairs of levers 17 and 18 as well as a connecting piece 19. The first lever pair 17 is located on the side of the embossing station 6 towards the supply roll 4 and bears the first compensating roll 15. The second compensating roll 16 is mounted on the second lever pair 18 on the other side of the embossing station 6. One end of the lever pair 17 or 18 is mounted so as to be rotatable around the fixed axis of a guide roller 20 or 21. The connecting piece 19 is connected articulatedly to the other end of the two pairs of levers 17 and 18. The distance between the guide rollers 20 and 21 is equal to the length of the connecting piece 19. The two pairs of levers 17 and 18 on the one hand, the connecting piece 19 and the distance between the guide rollers 20 and 21 on the other hand constitute the parallel sides of the parallelogram.

All the axes of the rolls 4, 5, 15, 16, 20 and 21 and the axes of the cylinders 7 and 8 are parallel to each other. Thus for example the axes in the drawing of FIG. 2 are shown perpendicular to the plane of the drawing. The lever pairs 17 and 18 also rotate in that plane when the connecting piece 19 is shifted.

The distances between the axes of rolls 15 and 20 on the lever pair 17 and those between the axes of the rolls 16 and 21 on the lever pair 18 are identical. These distances between axes and the length of the connecting piece 19 determine a maximum path over which the axes of the compensating rolls 15 and 16 can be shifted in parallel, e.g. by one half the circumference of the embossing cylinder 7.

The embossing station 6 is installed in such manner between the two lever pairs 17 and 18 that free displacement of the connecting piece 19 in its longitudinal direction is possible; the compensating roll 15 moves for example towards an inlet 22 of the embossing station 6 while the compensating roll 16 at the same time moves away from an outlet 23 of the embossing station 6.

The device is equipped with a control device 24 which produces a periodic relative movement of predetermined amplitude between the length of film 1 and the embossing matrix 12. The relative movement is synchronized with the revolution of the embossing cylinder 7 by a means of the control device 24.

The control device 24 can comprise for example a control disk 25 which is driven directly by the embossing cylinder 7 and a connecting link 27 which scans the edge of the control disk 25 and which moves around a fixed point of rotation 26 outside the control disk 25 in the plane of the drawing of FIG. 2. The shape of the control disk 25 is predetermined by the embossing cylinder 7. The connecting link 27 is provided with a groove in a radial direction relative to the point of rotation 26 into which a bolt, which is mounted at one end of a slide 28 engages in a displaceable manner. The slide 28 transmits the movements of the connecting link 27 to the connecting piece 19. The parallelogram rod system converts these movements into periodic excursions of the compensating rolls 15, 16. By displacing the bolt in the groove of the connecting link 27, the distance between the bolt and the point of rotation 26 and consequently the amplitude of the movements of the slide 28 is changed. The amplitude of the periodic excursions of the compensating rollers 15, 16 can thus be preset.

A scanning point 29 of the connecting link 27 slides along the edge of the control disk 25. A force, produced for example by a tension spring 30, is applied to the connecting link 27 and rotates the connecting link 27 around the point of rotation 26 against the control disk 25 so that the scanning point 29 precisely follows the edge of the control disk 25.

The radial distance between a scanning point 29 and the center of the control disk 25 decreases for example constantly during the embossing phase as a consequence of the rotation of the embossing cylinder 7 and thereby also of the control disk 25. During the free phase the scanning point 29 moves away from the center of the control disk 25 until the scanning point 29 has reached a maximum distance from the center at the beginning of the embossing phase. As soon as the starting edge 13 is located under the counter-pressure cylinder 8, the radial distance of the scanning point 29 decreases once more.

The non-embossed length of film 1 coming from the supply roll 4 is guided beneath the first guiding roll 20 and around same into a first loop 31 held in place by the first compensating roll 15 and into the embossing station 6. In the embossing plane 9 the length of film 1 runs between the embossing cylinder 7 and the counter-pressure cylinder 8. The second compensating roll 16 places the embossed length of film 1 into a second loop 32 between the cylinders 7 and 8 and the second guide roll 21. Going around the second guide roll 21, the embossed length of film 1 reaches the winding roll 5.

A drive roller 33 is installed parallel to the guide roll 20 in such manner that it is pressed by means of a predetermined force against the guide roll 20 and clamps the non-embossed length of film 1 for the transfer of drive forces.

An economical design is provided with one single motor 34 which drives the embossing cylinder 7, the control disk 25, the drive roller 33 and, via a slipping clutch, the winding roll 5, by means of simple gears 35, each at a predetermined, uniform rotational speed. The counter-pressure cylinder 8 can be driven in addition.

As soon as the drive roller 33 is set into motion, e.g. in a clockwise direction, the non-embossed length of film 1 is drawn off at a uniform draw-off speed from the supply roll 4. The non-embossed length of film 1 runs over the rolls 20 and 15 into the embossing station 6, is there pulled through between the cylinders 7 and 8 to be embossed and finally, having been embossed, goes over the rolls 16 and 21 to the winding roll 5. The embossing cylinder 7, the compensating rolls 15 and 16 as well as the drive roller 33 rotate in a clockwise direction while the supply roll 4, the wind-up roll 5, the counter-pressure cylinder 8 and the guide rolls 20, 21 rotate in a counterclockwise direction.

The control disk 25 rotates in the control device 24 in synchronization with the embossing cylinder 7. The connecting link 27, periodically with each revolution of the control disk 25 or of the embossing cylinder 7, executes a see-saw movement around the point of rotation 26 and this is transmitted in the form of a displacement with a predetermined amplitude to the compensating rolls 15 and 16. The control device 24 imparts an additional predetermined shifting speed to the length of film 1 in the embossing station 6 by means of the compensating rolls 15 and 16.

During the embossing phase the circumferential section 11 rolls under the pressure of the counter-pressure cylinder 8. It lasts from the point in time when the starting edge 13 is under the counter-pressure cylinder 8 until the point in them when the end edge 13' reaches the counter-pressure cylinder 8. In the embossing phase, the advancing speed of the length of film 1 in the embossing station 6 is equal to the embossing speed predetermined by the embossing cylinder 7 which corresponds to the circumferential speed of the embossing matrix 12. The advancing speed is greater by the shifting speed than the draw-off speed produced by means of the drive roller 33.

The length of the first loop 31 between the guiding roll 20 and the inlet 22 decreases therefore during the embossing phase in order to compensate for an excessive advance of the length of film 1 in the embossing station 6 which results from the difference between the embossing speed and the draw-off speed. At the same time the length of the second loop 32 is increased between the outlet 23 and the guide roll 21 by the excess advance speed at the outlet 23, since the embossed length of film 1 is wound up on the wind-up roll 5 with only a winding speed which is equal to the draw-off speed of the non-embossed length of film 1.

The free phase following immediately upon the embossing phase lasts until completion of each revolution of the embossing cylinder 7. The control disk 25 pushes the connecting link 27, and the compensating rolls 15, 16 by means of the slide 28 over the parallelogram rod system in the opposite direction of the movement of the length of film 1. Since the draw-off speed of the length of film 1 and the displacement speed are subtracted, the advancing speed of the length of film 1 decreases briefly in the embossing station 6, whereby the length of film 1 slows down, stops or withdraws by a predetermined length in direction of inlet 22 in accordance with the setting in the control device 24. In order to compensate, the length of the first loop 31 increases and the length of the second loop 32 decreases. Thus a relative movement between the length of film 1 and the embossing matrix 12 is produced periodically in the embossing station 6. The relative movement is repeated in the free phase of each revolution of the embossing cylinder 7. The amplitude of the relative movement can be set in the control device 24 and is predetermined by the motif interval 3 (FIG. 1).

Despite the periodic changes of the size of the loops 31 and 32 the length of film is always subject to a predetermined tension.

If the usable length of the embossing matrix 12 has for example room for 14.7 motif intervals 3 on the circumferential section 11, the motifs 2 (FIG. 2) are embossed in the embossing phase of a first revolution of the embossing cylinder 7 over a length which is 14.7 times one motif interval 3. The control device 24 then pushes the length of film 1 back by 0.7 parts of the motif interval 3 in the free phase so that with the next revolution of the embossing cylinder 7 the first motif on the embossing matrix 12 is embossed in the first 0.7 parts of the fifteenth motif interval for a second time on the length of film 1. The remainder of the motif 2 is then transferred in the fifteenth motif interval 3, and the following 13.7 motifs 2 of the embossing matrix 12 are transferred into the non-embossed length of film 1.

For example, the embossing matrix 12 has a usable length which is 14.7 times one motif interval 3 and has only a group of 14 complete negatives of the motif 2. The remainder of the usable length of 0.7 of the motif interval 3 is completely smooth. With each revolution of the embossing cylinder 7 this group of 14 motifs 2 is embossed, one after the other, into the length of film 1, followed by a length equal to 0.7 of the motif interval 3 with a smooth embossing. In the free phase, the length of film 1 is pushed back by a length of 0.7 of the motif interval 3 so that the next group of the 14 motifs 2 may follow the already embossed group at the same predetermined motif interval.

The relative portion of the circumference of the embossing cylinder 7 occupied by the recess 10 determines the duration of the free phase at a predetermined rotational speed of the embossing cylinder 7. The length of film 1 must be capable of freely shifting in the free phase during a sufficient period of time between the embossing cylinder 7 and the counter-pressure cylinder 8 so that the required reactive movement between the length of film 1 and the embossing matrix 12 is made possible. The share of the circumferential section 11 can for example represent approximately 75% of the circumference of the embossing cylinder 7 which has a customary circumference of 12 inches (=304.8 mm) and which rotates at 65 r.p.m. The amplitude of the relative movement can be set so precisely that the error margin of the motif interval in the passage from one group of motifs 2 to the next practically disappears.

The described embossing device has the advantage that different embossing matrixes 12 can be mounted, one after the other, on the same embossing cylinder 7. Replacement of the embossing cylinder 7 and adaptation of the corresponding gearing 35 is no longer necessary. The motifs 2 and the desired motif interval 3 on each embossing matrix 12 can be selected independently of the circumference of the embossing cylinder 7. Thereby all the motifs 2 with a smaller surface than the circumferential section 11 can be embossed into the length of film 1 by means of one single embossing cylinder 7, whatever their size within the desired motif interval 3. The predetermined duration of the free phase during which the length of film 1 executes the predetermined periodic relative movement determines the share of the circumference of the embossing cylinder 7 which is usable for embossing. This share can be over 80%.

Figure 3:
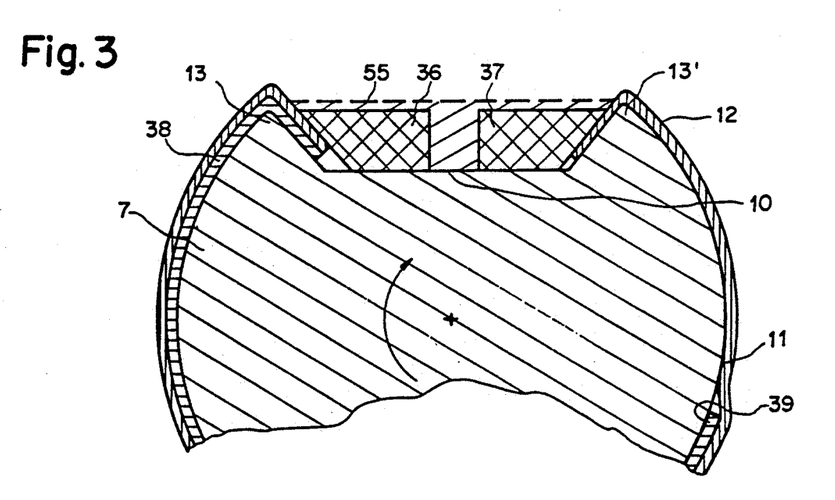
FIG. 3 shows a cross-section through an embossing cylinder.

FIG. 3 shows a device installed in the recess 10 for the attachment of the flexible embossing matrix 12 on the embossing cylinder 7. A first clamping jaw 36 presses the forward end of the embossing matrix 12 which is bent over the end of the starting edge 13 on the corresponding lateral wall of the recess 10. The rear end of the embossing matrix 12 is drawn over the end edge 13' and is held in place by means of the second clamping jaw 37.

When little space is available, the attachment of the embossing matrix 12 on the circumferential section 11 by means of one single wedge 55 instead of the two clamping jaws 36 and 37 is advantageous. The wedge 55 holds the two ends of the embossing matrix 12 against the lateral walls of the wedge-shaped recess 10 and can be attached by means of screws (not shown) to the bottom of the recess 10.

It is advantageous to lay a metal foil 38 under the embossing matrix 12 over its entire width. The forward end of the metal foil 38 is bent over the starting edge 13 like the embossing matrix 12 and is held together with it by means of the first clamping jaw 36. The metal foil 38 increases the radial distance of the embossing matrix 12 from the axis of the embossing cylinder 7 and has a repeat length on the circumferential section 11 as measured from the starting edge 13 which is an integral, multiple of the motif interval 3 (FIG. 1). A border 39 at the rear end of the metal foil 38 is cut at a parallel to a circumferential line of the circumferential section 11. The metal foil 38 can be made of 0.3 mm thick spring steel, for example.

The embossing pressure is set by means of the counter-pressure cylinder 8 (FIG. 2) to a predetermined value, sufficient for the embossing of the length of film 1, on a circumferential line of the embossing matrix 12 doubled with the metal foil 38. After passing over the edge 39 the embossing pressure drops to the value zero before the end of the embossing phase in order to avoid over-embossing or smooth-embossing of the length of film 1. The embossing pressure is thus at a predetermined value only over the repeat length of the foil 38. The relative movement between the length of film 1 and the embossing matrix 12 only starts with the beginning of the free phase.

Figure 4:
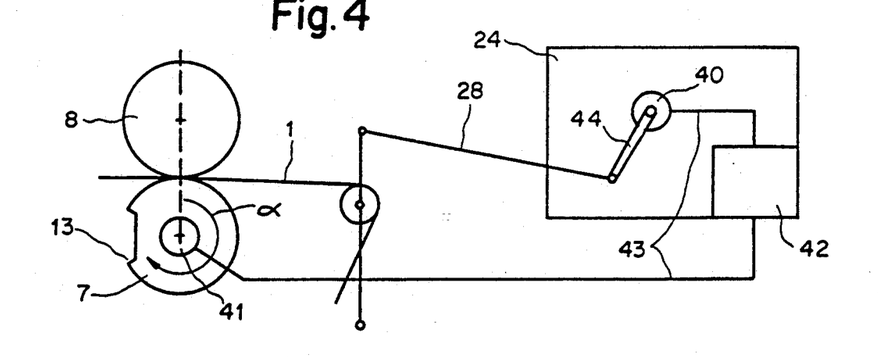
FIG. 4 shows a control device.

In FIG. 4 the control device comprises advantageously a stepping drive 40, e.g. a stepping motor or a linear motor, a shaft encoder 41 and an electronic circuit 42 which is connected to the stepping drive 40 and to the shaft encoder 41 via conductors 43. The shaft encoder 41 is mounted on the same axle together with the embossing cylinder 7 and transmits a signal corresponding to a rotational angle $\alpha$ of the embossing cylinder 7 to the circuit 42. The rotational angle $\alpha$ can be measured for example in the direction of rotation of the embossing cylinder 7 and is defined by an arrow between the connecting line of the axles of the cylinder 7, 8 and the radius to the starting edge 13.

The electronic circuit 42 converts these signals into an impulse sequence for the stepping drive 40 which can drive the control disk 25 (FIG. 2) directly, for example. The electronic circuit 42 is preferably capable of being programmed so that it renders possible an economical and reproducible adaptation of the control device 24 to the motif interval 3 (FIG. 1) and to the form of the embossing cylinder 7 used.

The stepping motor of the stepping drive 40 advantageously drives the slide 28 directly via a simple crank 44, so that the control disk 25 (FIG. 2) can be omitted.

The electronic circuit 42 calculates the momentary angular velocity of the stepping motor required for the movement of the slide 28 for the control of the advance speed of the length of film 1 as a function of the rotational angle α. The crank 44 describes an oscillating movement around a central position, the amplitude of which is predetermined by the motive interval 3.

Figure 5:
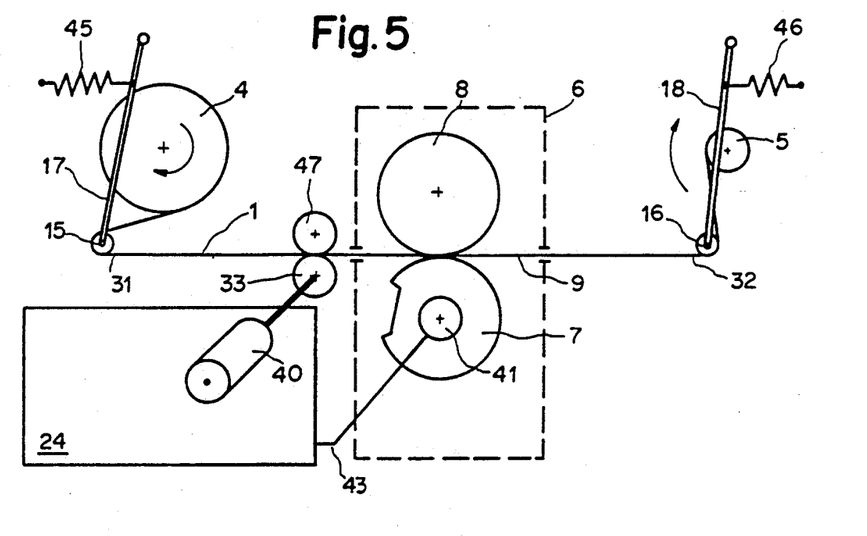
FIG. 5 shows an embossing device with a drive roller, the rotational speed of which changes periodically.

In the arrangement according to FIG. 5 the lever pairs 17 or 18 are mounted rotatable with an axle above the supply roll 4 or the wind-up roll 5. The compensating rolls 15 and 16 are capable of being displaced independently of each other along an arc of circle predetermined by the lever pairs 17 or 18 in the drawing plane of FIG. 5. A force which can be produced by means of tension springs 45, 46 for example acting upon the pairs of levers 17, 18 drives the compensating rolls 15, 16 apart and positions the length of film 1 in the embossing station 6. The elements required in the embossing device according to FIG. 2, the connecting piece 19 as well as the guide rolls 19 and 20 are omitted in FIG. 5.

The control device 24 is connected via the conductor 43 to the shaft encoder 41 provided on the embossing cylinder 7. The drive roll 33 is seated on the axle of the stepping drive 40 which contains a stepping motor and is driven directly.

The drive roll 33 and an auxiliary roll 47 which is parallel with it are placed advantageously between the first compensating roll 15 and the embossing cylinder 7, whereby the auxiliary roll 47 presses the length of film 1 against the drive roll 33 and prevents slippage between the drive roll 33 and the length of film 1.

The drive roll 33 produces the advance speed of the length of film 1 directly and has a predetermined, periodically changing angular speed. The control device 24 calculates the required impulse sequence for the stepping motor while also taking into account the circumference of the drive roller 33.

The length of film 1 can be unwound clockwise from the supply roll 4 for example, can be guided counter-clockwise around the first compensating roll 15 towards the embossing station 6, can be guided through the space between the drive roller 33 and the auxiliary roll 47 as well as between the embossing cylinder 7 and the counter-pressure cylinder 8 and can be wound counter-clockwise around the second compensating roll 16, be pulled away from the embossing station 6 and wound up clockwise on the wind-up roll 5.

The irregular advance speed of the length of film 1 in the embossing plane 9 is averaged out by the modification of the loops 31 and 32 so that the length of film 1 may not be overstretched during unwinding from the supply roll 4 by the occurring accelerations and may be wound up evenly on the wind-up roll 5. The direct drive makes it possible to advantageously obtain a very precise, reproducible relative movement in the free phase of the embossing cylinder 7 between the length of film 1 and the embossing matrix 12, using little mechanical expenditure and with minimal load on the length of film 1 resulting from undesirable, sudden stretch tension.

The compensating rolls 15, 16 can of course also be controlled by other means than the simple lever pairs 17, 18 described here. The compensating rolls 15, 16 could also move in a straight displacement, perpendicular to the axis of the embossing cylinder 7 and parallel to the embossing plane 9, instead of the described movement along an arc of circle.

Figure 6:
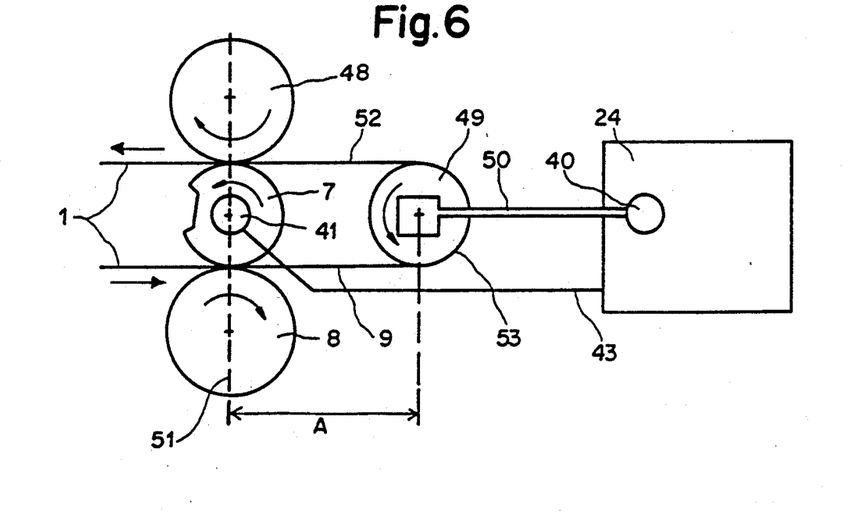
FIG. 6 shows an embossing device with two counterpressure cylinders and with one deflection roller, FIG. 7 plots the pressure of the counterpressure cylinder and the deflection of the deflection roller as a function of angle.

An advantageous device is shown in FIG. 6 which embosses on the length of film 1 at two locations at a predetermined distance from each other with the same embossing cylinder 7. It comprises two counter-pressure cylinders 8, 48 offset by 180° which roll against the embossing cylinder 7, a shiftable deflection roller 49 with a diameter that could be equal to that of the embossing cylinder 7 for example, and a control device 24 which controls the stepping drive 40. A rod 50 is equipped at one end with a shiftable bearing of the deflection roller 49 while the other end can be made in form of a toothed rod for example which engages into the stepping drive 40. The axes of the cylinders 7, 8 and 48 define an axial plane 51. The deflection roller 49 is located on one side of the axial plane 51 while the winding or unwinding devices of the length of film 1 and the compensating rolls (not shown here) are on the other side.

The axle of the deflection roller 49 can be adjusted under control of the control device 24 along a straight line which is perpendicular to the axial plane 51. The distance A between the axles of the deflection roller 49 and the embossing cylinder 7 is set to a predetermined median value by means of the stepping drive 40 and in accordance with the repeat length. The signal transmitted by the shaft encoder 41 via the conductor 43 to the control device 24 causes a change in the distance A periodically and in synchronization with each revolution of the embossing cylinder 7, whereby the momentary value of A oscillates around this median value. The amplitude of the change of the distance A can be set in a predetermined manner on the control device.

The length of film 1 is subjected to a predetermined tensioning pull produced by at least two compensating rolls. The non-embossed length of film 1 arrives from an unwinding device (not shown) and goes in the embossing plane 9 towards the axial plane 51, it runs between the embossing cylinder 7 and the counter-pressure cylinder 8 and around the deflection roller 49. The latter guides the length of film 1 around 180° into another embossing plane 52 back to the embossing cylinder 7. After having passed between the embossing cylinder 7 and the additional counterpressure cylinder 48, the embossed length of film 1 is guided to a wind-up device (not shown).

The two embossing planes 9 and 52 are perpendicular to the axial plane 51 and are planes that are tangent to the embossing cylinder 7.

The change in the distance A enlarges or reduces a deflection loop 53 which is put in place by the length of film 1 on the side of the axial plane 51 towards the deflection roller 49. The embossing cylinder 7 rotates evenly and the embossing matrix 12 (FIG. 3) runs at the predetermined embossing speed. At both lines formed by the intersection of the axial plane 51 with the two embossing planes 9 and 52, embossing takes place at the same time. For this reason the embossing planes 9 or 52 go through their embossing and free phases with each revolution of the embossing cylinder 7. In the additional embossing plane 52, the embossing and free phases are phase-shifted in comparison with the embossing plane 9 by 180°.

Since each of the two embossing phases extends over more than 50% of the circumference of the embossing cylinder 7, the length of film 1 is at all times in the embossing phase, at least in one of the two embossing planes 9, 52, so that the interaction of the embossing cylinder 7 with the two counter-pressure cylinders 8 and 48 causes it to be pulled off from the supply roll 4 (FIG. 5) and via compensating roll 15. A drive roll 33 (FIG. 5) can be dispensed with.

The non-embossed length of film 1 is embossed with a first group of motifs 2 (FIG. 1) in the lower embossing plane 9, e.g. on the repeat length. In the immediately following free phase the advance speed of the length of film 1 is increased by enlargement of the deflection loop 53 so that the length of film 1 may be pulled forward by the repeat length. At the same time the additional embossing plane 52 is in the embossing phase and the length of film 1 is pulled forward there at the set embossing speed. The beginning of the next group of motifs 2 embossed in the lower embossing plane 9 is at a distance of the repeat length from the group embossed immediately before.

Each non-embossed gap between the groups of the motifs 2 is embossed in the additional embossing plane 52 with a group of motifs 2 by means of the same embossing matrix 12. In the free phase of the additional embossing plane 52 the distance A of the deflection roller 49 decreases so that the length of foil may be pulled forward by the repeat length to the next gap at the increased advance speed. Therefore the distance A changes periodically, whereby the deflection roller 53 acts as a buffer storage for the alternate excess advance of the length of film 1 in the embossing planes 9, 52.

The advantage of this device is a greater embossing capacity at the same embossing speed, because the length of film 1 is not slowed down in the free phase but is on the contrary accelerated, since the draw-off speed is greater than the embossing speed.

Figure 7:
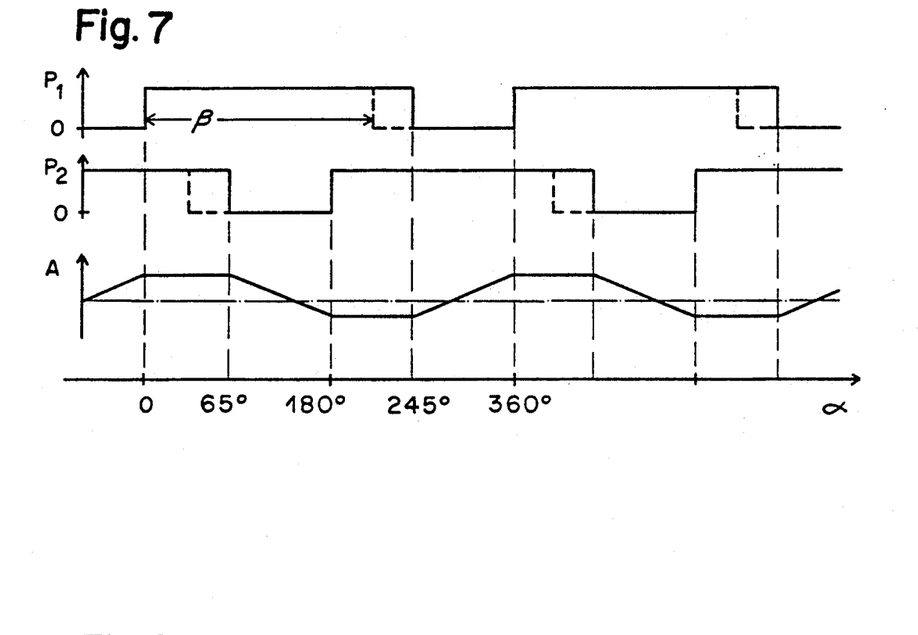

FIG. 7 shows the embossing pressure $P_1$ under the counter-pressure cylinder 8, the embossing pressure $P_2$ under the counter-pressure cylinder 48 and the distance A as a function of the rotation angle $\alpha$. In the example shown the embossing phase is 245° and the free phase is 115° in both embossing planes 9, 52. In case that the metal foil 38 (FIG. 3) is inserted under the embossing matrix 12 the embossing pressure $P_1$ or $P_2$ drops before the end of the embossing phase, as is shown with hatch marks in FIG. 7. The repeat length determines an embossing angle $\beta$ which is smaller than the embossing phase.

The free phases in which the embossing pressure $P_1$ or $P_2$ assume the value zero occur between 65° and 180° in the embossing plane 52 (FIG. 6) and between 245° and 360° in the embossing plane 9. The distance A is reduced between 65° and 180° and increased between 245° and 360° since the embossing angle $\beta$ is greater than 180°. If the two embossing planes 9, 52 are in the embossing phase, the length of film 1 does not execute any relative movement against the embossing matrix 12 and the size of the deflection loop 53 as well as the value A remain constant.

If the embossing angle $\beta$ is equal to 180°, the distance A is maintained constant at a predetermined value as in the state of the art. If the embossing angle $\beta$ is less than 180°, the phase position of the function of the distance A shifts from the phase position shown in FIG. 7 by 180°, i.e. the embossing speed is greater than the draw-off speed.

Figure 8:
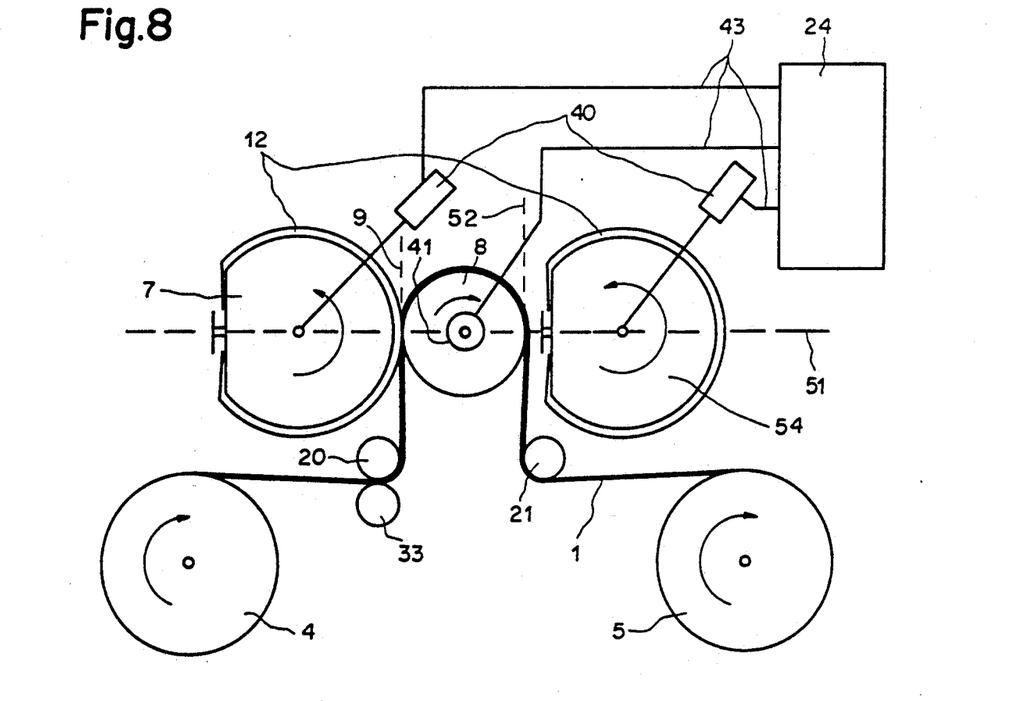
FIG. 8 shows an embossing device with two embossing cylinders with periodically changing angular velocities.

The embossing device according to FIG. 8 is provided with two identical embossing cylinders 7, 54, each with a possibly identical embossing matrix 12, said embossing cylinders rolling against the counter-pressure cylinder 8. The axles of the cylinders 7, 8 determine the axial plane 51. Each embossing cylinder 7 or 54 is capable of being shifted radially towards the counter-pressure cylinder 8 so that the predetermined embossing pressure can be set for each embossing cylinder 7 or 54. Each embossing cylinder 7 or 54 is driven advantageously by means of an independent stepping drive 40. The control device 24 is connected via the conductors 43 to the shaft encoder 41 and to the stepping drives 40. The shaft encoder 41 is seated on the axle of the counter-pressure cylinder 8 and transmits its angle of rotation to the control device 24 which produces a predetermined impulse sequence for each stepping drive 40.

The length of film 1 is supplied and removed on the same side of the axial plane 51 in such manner that it remains under the predetermined tension. It is guided by the supply roll 4 via compensating roll 20 into the embossing plane 9 and is guided via the counter-pressure cylinder 8 into the additional embossing plane 52. The embossed length of film 1 then runs over the guide roll 21 and onto the wind-up roll 5.

As an example, the drive roll 33 is arranged so that it rolls on the guide roll 20. The drive roll 33 is connected to a motor which is not shown here and drives the length of film 1 at the uniform, predetermined advance speed which is equal to the embossing speed.

Each embossing cylinder 7 or 54 has its embossing and free phase. During each embossing phase the angular velocity of the embossing cylinder 7 or 54 is constant, whereby the embossing matrixes 12 and the counter-pressure cylinder 8 run at an embossing speed which is equal to the advance speed of the length of film 1 at their circumference. In each free phase the angular speed of the embossing cylinder 7 or 54 is reduced in synchronization with each revolution of the counter-pressure cylinder 8 and is again raised to the former value. Since the length of film 1 is advanced evenly, the relative movement between the length of film 1 and the embossing matrix 12 is created in the free phase. The angular velocity of the embossing cylinder 54 is shifted in relation to the embossing cylinder 7 by a predetermined phase relationship dependent upon the predetermined diameter of the counter-pressure cylinder 8 and upon the repeat length.

The groups of the motifs 2 are embossed on the repeat length in the length of film 1 in the embossing plane 9, whereby the non-embossed gap of the repeat length is created between two adjoining groups because of the lowering of the angular velocity of the embossing cylinder 7 in the free phase. In the additional embossing plane 52 the additional embossing cylinder 54 embosses the groups of the motifs 2 precisely into the non-embossed gap while in its free phase said embossing cylinder 54 lets the length of film 1 which has been embossed on the repeat length under the embossing cylinder 7 pass by.

The drive roll 33 can also be made to roll against the counter-pressure cylinder 8 for example, and can drive the length of film 1 at that point.

The utilization of two embossing matrixes 12 with different repeat lengths is possible, whereby the control device 24 calculates the corresponding reduction of the angular velocity for each embossing cylinder 7 and 54 on basis of the repeat length of its embossing matrix 12.

The advance speed of the length of film 1 which is uniform in the entire embossing device is advantageous because the length of film 1 is subjected only to a uniform, minimal tension load and therefore even lengths of film 1 with very low tensile strength can be embossed without damage to the embossed motives 2 due to excessive stretching.

Figure 9:
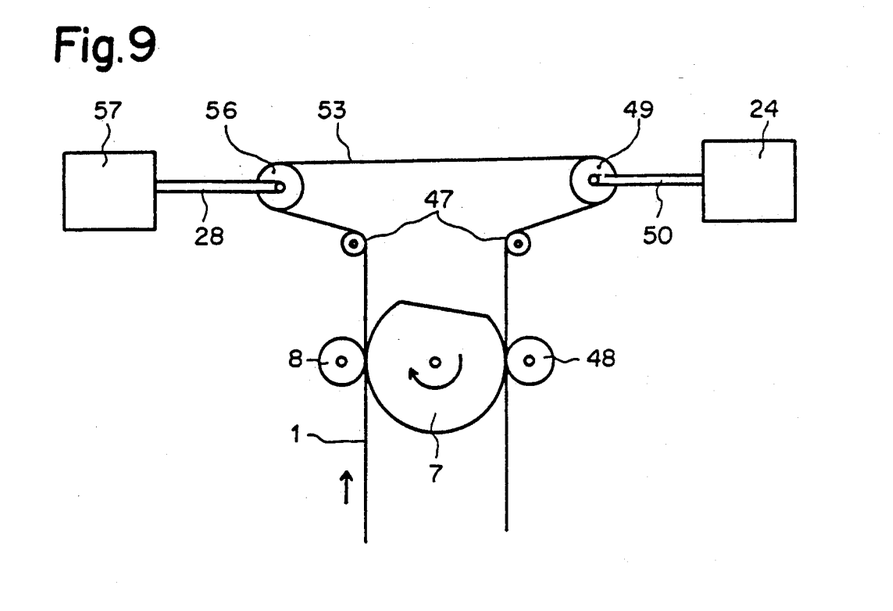
FIG. 9 shows an embossing device with two deflection rollers.

In FIG. 9 the deflection roller 49 (FIG. 6) is preferably replaced by two rollers 49 and 56 with axles capable of being shifted in order to decrease the periodically moved, inertial mass of the deflection roller 49. The length of film 1 is brought twice via the deflection loop 53 to the embossing cylinder 7 where the length of film 1 is embossed between the counter-pressure cylinders 8 and 48 offset by 180°. Two auxiliary rollers 47, the deflection roller 49 and the adjustment roller 56 put the deflection loop 53 in place.

An adjusting drive 57 engages via slide 28 the shiftable axle of the adjustment roller 56 and determines the median length of the deflection loop 53 in accordance with the circumference of the embossing cylinder 7. The control device 24 transmits a predetermined periodic shift synchronized with the rotation of the embossing cylinder 7 by means of the rod 50 to the axle of the deflection roller 49 so as to change the length of the deflection loop 53 periodically and to coordinate the movement of the length of film with the embossing matrix 12 (FIG. 3).

Figure 10:
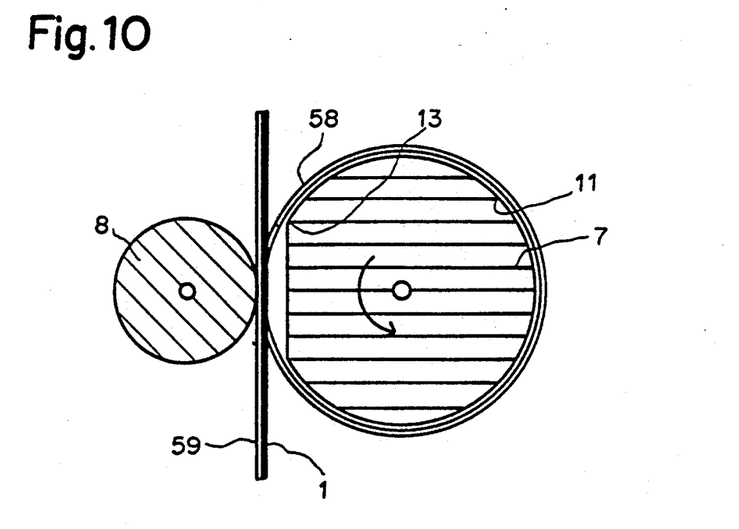
FIG. 10 shows an embossing cylinder with a lateral bearing race.

In FIG. 10 the embossing cylinder 7 or 54 (FIG. 8) is provided on either side with a bearing race 58 seated on the same axle. The diameter of the bearing race 58 is larger by a predetermined amount than the diameter of the embossing cylinder 7 or 54. The counter-pressure cylinder 8 or 48 (FIG. 9) rolls constantly against the two bearing races 58. Together with a metal foil 38 (FIG. 3) which may be used, the embossing matrix 12 (FIG. 3) is held in the depression between the two bearing races 58 on the circumferential section 11. The value of the embossing pressure between the length of film 1 and the embossing matrix which is reached beneath the counter-pressure cylinder 8 or 48 is predetermined by the combined height reached on the circumferential section 11 by the embossing matrix 12, the metal foil 38 (if used) and the length of film. This arrangement avoids the sudden, gear-damaging increase of the torque needed to rotate the embossing cylinder 7 or 54 when the starting edge 13 reaches the counter-pressure cylinder 8 or 48.

For example, an auxiliary paper, metal or plastic band 59 of equal width as the length of film 1 can be run through the embossing station 6 (FIG. 2) together with the length of film so that the length of film 1 and the auxiliary band 59 may be of sufficient thickness for the embossing pressure. The auxiliary band 59 rests on the non-embossed side of the length of film 1 and can be placed on the supply roller 4 (FIG. 2) for example, in form of a support band on the length of film 1, or it can be united with the length of film 1 immediately before the embossing station 6, whereby the auxiliary band 59 can be used repeatedly and be made in form of an endless band, for example.

Finally, the above-described embodiments of the invention are intended to be illustrative only. Numerous alternative embodiments may be devised by those skilled in the art without departing from the spirit and scope of the following claims.

We claim:

1. A device for embossing a set of motifs having a predetermined motif interval onto a length of thermoplastic film, said device comprising:
a rotating embossing cylinder which is provided on its outer circumference with a recess and an embossing matrix attached thereto for embossing said motifs onto said film, said motifs comprising fine relief-like structures, said embossing matrix having a usable length which is less than the entire circumference of the embossing cylinder but more than 50% of the circumference of the embossing cylinder,
a rotating counterpressure cylinder positioned adjacent said embossing cylinder, said length of film advancing between said counterpressure cylinder and said embossing cylinder for embossing said motifs from said embossing matrix and for defining a free phase during each rotation of said embossing cylinder when said recess is positioned adjacent said film,
movement means for causing an additional relative movement between the length of film and the embossing matrix during each free phase of the embossing cylinder, and
control means in communication with the movement means for determining the amplitude of the additional relative movement, said control means including means to determine said amplitude in accordance with the motif interval.

2. The device of claim 1 wherein the embossing matrix is flexible, wherein a metal foil is located between the embossing matrix and the embossing cylinder over the entire width of said embossing matrix, and wherein the metal foil supports the embossing matrix over a repeat length which is an integral multiple of a motif interval.

3. The device of claim 1 wherein the embossing cylinder runs at a predetermined uniform rotational speed and wherein the control means comprises means for synchronizing the additional relative movement with the embossing cylinder.

4. The device of claim 3 wherein displaceable compensating rolls are provided on either side of the embossing cylinder parallel with said embossing cylinder to guide the length of film in an embossing plane between the counterpressure cylinder and the embossing cylinder and wherein a periodic displacement of the compensating rolls in a direction perpendicular to their axes is provided to compensate for a periodic additional relative movement of the length of film in form of a speed change of the film between an embossing speed and a draw-off speed from a supply roll.

5. The device of claim 4 wherein a drive roll is installed between a supply roll and a first of said compensating rolls, wherein the draw-off speed of the length of film which is produced by means of the drive roll is predetermined and constant, and wherein the control means and a parallelogram rod system connected to the control means and comprising two lever pairs and a connecting piece are provided to produce the periodic displacement of the compensating rolls.

6. The device of claim 4 wherein the lever pairs are equipped with tension springs to tension the length of film in the embossing plane by means of the compensating rolls, wherein the drive roll is located between the first compensating roll and the embossing cylinder, wherein the drive roll is seated on an axle of a stepping drive, and wherein the production of the periodic additional relative movement of the length of film is provided through a modification of the angular velocity of the stepping drive by means of a predetermined impulse sequence from the control means.

7. The device of claim 3 wherein an additional counterpressure cylinder is installed adjacent to the embossing cylinder and is offset by 180° in relation to the first counterpressure cylinder, wherein the axes of the counterpressure cylinders define an axial plane, wherein a deflection roller positions a deflection loop, wherein an axle of the deflection roller is adjustable by means of a stepping drive on a straight line which is perpendicular to the axial plane and which intersects the axis of the embossing cylinder, and wherein a second embossing of the length of film in a second embossing plane is effected between the additional counterpressure cylinder and the embossing cylinder by the deflection roller.

8. The device of claim 2 wherein two embossing cylinders are present and are offset by 180° in their placement with respect to the counter-pressure cylinder, wherein the length of film is moved in two embossing planes at an even advance speed, wherein each embossing cylinder is provided with its own stepping drive triggered by the control means in a predetermined manner, wherein the control means includes means for synchronizing the stepping drives with the rotation angle of the counterpressure cylinder and wherein during the free phase of each revolution of each embossing cylinder said additional relative movement comprises a reduction of the angular velocity of one embossing cylinder corresponding to the repeat length of the embossing matrix of the other embossing cylinder.

* * * * *